United States Patent
Brede

(10) Patent No.: US 11,550,022 B2
(45) Date of Patent: Jan. 10, 2023

(54) PROXIMITY DETERMINATION USING RADIO DEVICES

(71) Applicant: NORBIT ITS AS, Trondheim (NO)

(72) Inventor: Steinar Brede, Trondheim (NO)

(73) Assignee: Norbit ITS AS, Trondheim (NO)

( * ) Notice: Subject to any disclaimer, the term of this patent is extended or adjusted under 35 U.S.C. 154(b) by 219 days.

(21) Appl. No.: 16/766,612

(22) PCT Filed: Nov. 23, 2018

(86) PCT No.: PCT/GB2018/053398
§ 371 (c)(1),
(2) Date: May 22, 2020

(87) PCT Pub. No.: WO2019/102214
PCT Pub. Date: May 31, 2019

(65) Prior Publication Data
US 2021/0003660 A1  Jan. 7, 2021

(30) Foreign Application Priority Data

Nov. 24, 2017 (GB) ........................... 1719545

(51) Int. Cl.
*G01S 3/02* (2006.01)
*G01S 5/02* (2010.01)
(Continued)

(52) U.S. Cl.
CPC .......... *G01S 5/0278* (2013.01); *G01S 5/0273* (2013.01); *G01S 11/06* (2013.01); *G06Q 20/327* (2013.01);
(Continued)

(58) Field of Classification Search
CPC ...... G01S 5/0278; G01S 5/0273; G01S 11/06; G06Q 20/3224; G06Q 20/327; H04B 17/27
(Continued)

(56) References Cited

U.S. PATENT DOCUMENTS 8,270,905 B1 * 9/2012 Cahill .................. H04B 17/27
455/67.11
8,532,676 B1 * 9/2013 El-Sallabi .............. H04B 17/27
455/67.11
(Continued)

FOREIGN PATENT DOCUMENTS

| WO | 2006025750 | 3/2006 |
|----|-----------|--------|
| WO | 2006137740 | 12/2006 |
| WO | 2017060194 | 4/2017 |

*Primary Examiner* — Marcos Batista
(74) *Attorney, Agent, or Firm* — Diederiks & Whitelaw, PLC.

(57) ABSTRACT

A radio system is provided which comprises a radio receiver and a processing system, wherein the radio receiver is configured to detect radio signals transmitted from a radio transmitter on a plurality of frequency channels, and to measure respective signal strengths of the radio signals for each of the plurality of frequency channels. The processing system is configured to evaluate a measure of statistical dispersion of the respective signal strengths over the plurality of frequency channels, and to use the measure of statistical dispersion to determine information relating to a proximity of the radio transmitter to the radio receiver.

16 Claims, 8 Drawing Sheets

(51) Int. Cl.
*H04B 17/27* (2015.01)
*G01S 11/06* (2006.01)
*G06Q 20/32* (2012.01)

(52) U.S. Cl.
CPC ......... *G06Q 20/3224* (2013.01); *H04B 17/27* (2015.01)

(58) Field of Classification Search
USPC .......................... 342/455; 455/312; 370/338
See application file for complete search history.

(56) References Cited

U.S. PATENT DOCUMENTS

| | | | |
|---|---|---|---|
| 10,482,440 B1* | 11/2019 | White | G07G 1/0009 |
| 2003/0228846 A1 | 12/2003 | Berliner et al. | |
| 2008/0307025 A1 | 12/2008 | Licul | |
| 2014/0185464 A1 | 7/2014 | Yang et al. | |
| 2014/0378056 A1 | 12/2014 | Liu | |
| 2016/0132231 A1* | 5/2016 | Rathod | G06F 3/04845 715/727 |

\* cited by examiner

PROXIMITY DETERMINATION USING RADIO DEVICES

CROSS-REFERENCE TO RELATED APPLICATIONS

This application represents the U.S. National Phase of International Application number PCT/GB2018/053398 entitled "Proximity Determination Using Radio Devices" filed 23 Nov. 2018, which claims benefit to Great Britain Application No. 1719545.4 filed 24 Nov. 2017, all of which are incorporated herein by reference.

BACKGROUND OF THE INVENTION

This invention relates to methods of proximity determination using radio devices, particularly those suitable for use within payment systems.

It is often desirable to detect when one device is in proximity of another device, without requiring physical contact. This may be used to trigger an action, such as sounding an alarm, or processing a payment transaction. What constitutes proximity will depend on the context: in some cases, it may be being within a few millimetres, while in other situations it could be being within a few kilometres.

One approach to detecting proximity uses radio signals. Known methods include measuring the time-of-flight of a radio signal between a transmitter and a receiver, and measuring the signal strength of a radio signal at a receiver. Time-of-flight systems, such as the RADAR systems installed in some self-driving cars, are complex and difficult to implement. Signal strength can be used instead to determine proximity—for example, proximity to a Bluetooth™ beacon—but this is typically unreliable because materials in the environment can absorb or reflect radio energy, leading to misleading measurements. Existing methods particularly struggle when only a single transmitter and a single receiver are communicating, because trilateration or triangulation from multiple reference points is not then possible.

SUMMARY OF THE INVENTION

The present invention seeks to provide a more accurate approach to proximity detection using signal strength.

From a first aspect, the invention provides a radio system comprising a radio receiver and a processing system, wherein:

the radio receiver is configured to detect radio signals transmitted from a radio transmitter on a plurality of frequency channels, and to measure respective signal strengths of the radio signals for each of the plurality of frequency channels; and the processing system is configured to evaluate a measure of statistical dispersion of the respective signal strengths over the plurality of frequency channels, and to use the measure of statistical dispersion to determine information relating to a proximity of the radio transmitter to the radio receiver.

From a second aspect, the invention provides a method of controlling a radio system, the method comprising:

a radio receiver detecting radio signals transmitted from a radio transmitter on a plurality of frequency channels;

the radio receiver measuring respective signal strengths of the radio signals for each of the plurality of frequency channels; and a processing system evaluating a measure of statistical dispersion of the respective signal strengths over the plurality of frequency channels, and using the measure of statistical dispersion to generate information relating to a proximity of the radio transmitter to the radio receiver.

Thus it will be seen that, a statistical dispersion of the signal strength is measured over a plurality of frequency channels, and used to determine proximity information. This approach can implicitly harness multipath effects to improve the reliability of the proximity information, compared with using a single signal strength measure from only one frequency channel, or averaged over a plurality of frequency channels. When each transmitted radio signal is reflected from a surface in an environment of the transmitter and receiver, different standing waves for each radio signal are set up, caused by interference between the incident and reflected signals. The constructed standing waves are different for each frequency channel, and therefore the signals in each channel have different intensities at different points in space. When the reflected signals received at the radio receiver are weak in comparison to the direct-path signals, the impact of the reflected signals on the measured signal strength for each frequency channel is small and the received signal strengths are substantially equal over the plurality of frequency channels, however when the intensities of the reflected signals are strong compared to the direct-path signals (e.g., having strengths that are a significant fraction of the direct-path signal strengths, such as 20%, 50%, 100% or more), a considerable statistical dispersion in the measured signal strengths across the frequency channels can be detected by the receiver.

The relative intensities for the reflected and direct signals are directly linked to the proximity of the transmitter and the receiver. The distance travelled by a reflected signal is always greater than that for the direct signal, and therefore the reflected signal will generally be more attenuated than the direct signal (assuming an unobstructed line-of-sight path exists between transmitter and receiver). In most real-world environments, when the transmitter and receiver are highly proximal, any reflected signal is likely to be small in intensity compared to the direct signal, because there are unlikely to be surfaces that are highly reflective to radio signals in comparable proximity to the transmitter and receiver. In addition, any reflective surfaces that do happen to be in close proximity will have only limited influence on the statistical dispersion as any difference in the distance travelled by the direct and reflected signals will be minimal. However as the transmitter and the receiver move further apart, the relative intensities of reflected and direct signals typically converge, and the reflected component becomes more significant, resulting in increased statistical dispersion of the respective signal strengths over the plurality of frequency channels.

As a result, by measuring the dispersion of signal strength in different frequency channels, information relating to the proximity of the radio transmitter to the radio receiver can be determined.

In some embodiments the radio system also comprises the radio transmitter, which is configured to transmit radio signals on the plurality of frequency channels.

In some embodiments, the radio transmitter and radio receiver are in an environment, which may be an indoor environment. The environment may comprise one or more surfaces that are reflective to radio signals in the frequency channels. These could be fixed surfaces, such as walls or floors, or they may be mobile surfaces, such as tables or chairs. One or more of the radio signals received by the radio receiver may comprise a reflection off a surface in the environment. The radio receiver may also receive one or more of the radio signals along a direct path from the radio transmitter to the radio receiver.

The information relating to the proximity may comprise a numerical value, which may be a separation metric. This value may increase with increasing geometrical distance between the radio transmitter and the radio receiver; however, this increase need not necessarily be linear. A relationship between the information relating to the proximity and the physical separation distance may be known (e.g., if a calibration operation has been performed) or it may be unknown. The relationship may depend on the environment in which the radio transmitter and receiver are located—in particular, on what reflective surfaces are present. Even if the relationship is not known (e.g., if a separation distance in metres cannot accurately be determined), it may nevertheless still be possible to use the information to perform useful operations, for example by determining when a threshold value is passed.

The mean signal strength, averaged over all the frequency channels, is not particularly reliable as a measure of proximity on its own because the presence of absorbing materials between transmitter and receiver cannot be distinguished from an increased transmitter-receiver separation distance. For example, if a transmitter were proximal to a receiver but the direct signal path were heavily suppressed for some reason (e.g. the radio receiver is contained in a user's pocket), it would be impossible, using measurements of mean signal strength alone, to discriminate between this scenario and one in which the receiver is unsuppressed but more distant.

Because the statistical dispersion caused by constructive and destructive interference in the environment is maintained even when the signals are suppressed by an intervening absorber, the level of dispersion can be measured to quantify the transmitter-receiver separation distance in a way that is not susceptible to interference from absorbing materials.

While, as highlighted above, the average signal strength over all the frequency channels is not particularly reliable as a measure of proximity in isolation, in some embodiments the processing system may be configured to use an average of the respective signal strengths of radio signals in the plurality of frequency channels, in combination with the measure of statistical dispersion, when determining the information relating to the proximity of the radio transmitter to the radio receiver. The average may be over all the plurality of frequency channels, or over a subset of the plurality of frequency channels. The average may equal, or be representative of, a mean or a median. It may be scaled or offset by a predetermined value, such as being scaled by the number of frequency channels included in the average (in which case it may equal the aggregate signal strength over the frequency channels). The average may be only a frequency average (e.g., involving at most one respective signal strength measurement from each frequency channel), or it may average over time as well as over frequency (e.g., involving a plurality of signal strength measurements from at least one of the frequency channels).

In some embodiments a weight may be applied to the average signal strength when determining information relating to the proximity of the radio transmitter to the radio receiver; the weight may depend on the measure of statistical dispersion. A time-sequence of such weighted average signal strengths may be tested at intervals against a proximity criterion (e.g., a threshold value) to detect when the radio transmitter and the radio receiver satisfy a proximity condition. Weighting the average signal strength appropriately can, for example, enable the radio system to evaluate the proximity of the radio transmitter to the radio receiver in scenarios which could be ambiguous if only the measure of statistical dispersion (or only the average signal strength) were used. The measure of statistical dispersion may, in such embodiments, act as an indicator of a degree of confidence in the average signal strength as a measure of proximity. Combining the average signal strength and the measure of statistical dispersion by applying an appropriate weight can enable accurate information relating to proximity to be determined even in potentially ambiguous scenarios (e.g. when the average signal strength is high but the measure of statistical dispersion is also high, or when the average signal strength is low but the measure of statistical dispersion is also low).

In some embodiments applying a weight to the average signal strength may comprise ignoring or masking values of the average signal strength (e.g. applying a weight of zero) when the measure of statistical dispersion meets a predetermined criterion such as exceeding a predetermined threshold, i.e. when the statistical dispersion indicates that the average signal strength is not an accurate representation of the proximity. The threshold may be fixed or it may be calculated relative to the average signal strength. The threshold may depend on previously determined proximity information.

In some embodiments, the average signal strength is weighted by the measure of statistical dispersion so as to calculate information relating to a proximity of the radio transmitter to the radio receiver, for example to calculate a separation metric that decreases monotonically with decreasing statistical dispersion for some or all values of average signal strength and/or that decreases monotonically with increasing average signal strength for some or all values of statistical dispersion. For example, the separation metric may be derived from, or may equal, a product or a quotient of the average signal strength and the measure of statistical dispersion.

Multipath effects may also cause the average signal strength to change over time, and although this consequence of multipath effects is likely to be less significant than that seen in the measure of statistical dispersion, it can still provide additional information that may be useful when determining proximity. In some embodiments therefore the processing system is configured to measure a change (e.g. by calculating the variance or standard deviation) in the average signal strength over time and to use this measurement when generating information relating to a proximity. For example, if the average signal strength is changing significantly over time and the measure of statistical dispersion is high, the radio system may infer with relatively high confidence that the radio receiver is relatively far away from the radio transmitter.

The processing system may be configured to use the measure of statistical dispersion to determine or detect when the radio transmitter and the radio receiver satisfy a predetermined proximity criterion. In some embodiments, an action is performed by the radio transmitter or by the radio receiver in response to the information relating to the proximity satisfying a proximity criterion (also referred to herein as a proximity condition), such as passing a threshold value. The threshold may correspond to a maximum separation distance between the transmitter and the receiver.

For example, in some embodiments, data is transferred between the transmitter and the receiver (i.e., from the transmitter to the receiver, or from the receiver to the transmitter, or both) in response to the information relating to the proximity satisfying a proximity criterion, such as passing a threshold value. The data transferred may comprise sensitive information, such as personal data. The data may be transferred by radio; it may be transferred on one or more of the frequency channels. The data may be transferred using a radio protocol to which the aforesaid radio signals also conform. The radio transmitter may comprise an antenna that the transmitter uses both for transmitting the aforesaid radio signals on the plurality of frequency channels and for transmitting or receiving said data. The radio receiver may comprise an antenna that the receiver uses both for receiving the aforesaid radio signals on the plurality of frequency channels and for transmitting or receiving said data. The proximity criterion can be used to ensure that such information is transferred only when the recipient device is in close range; this can prevent the information being sent to the wrong device by mistake, provide a more reliable user experience and may make eavesdropping more difficult.

Reduction of the signal strength for a radio signal in a particular frequency channel, due to interference from reflected signals travelling along different path lengths, is commonly known as multipath fading. The degree to which multipath fading is seen for any particular locations of the transmitter and receiver is dependent upon the wavelength of the transmitted signals. A relatively short wavelength signal may experience significant fading over short transmitter-receiver distances, whereas for a longer wavelength signal the multipath fading will only be apparent over longer distances. Thus, in some embodiments, the frequencies of the transmitted signals are at least 100 MHz and preferably more than 1 GHz. They may be between 1 GHz and 10 GHz, for example around 2 GHz.

It may be desirable that the radio signals transmitted by the transmitter have similar frequencies, to ensure that differential attenuation is minimised when the signals pass through, for example, a material with frequency dependent attenuation properties. In addition, it can be difficult to manufacture an antenna which provides a uniform gain over a large frequency span. Preferably, signals in a highest-frequency channel of the plurality of frequency channels have a frequency within 10%, or more preferably within 5%, of the frequency of signals in a lowest-frequency channel of the plurality of frequency channels.

In some embodiments the radio signals are transmitted according to a Bluetooth™ protocol, preferably according to the Bluetooth Low Energy (BLE)™ standard. The radio transmitter (e.g., a cell phone) may transmit radio packets (e.g., Bluetooth™ advertising packets) at intervals, which may be regular intervals. A transmission rate of around five, ten, twenty, thirty or more packets a second on each frequency may be used. A higher rate (e.g., 30 Hz or above) has been found to give particularly good proximity sensing for a handheld radio transmitter or receiver, in typical use cases (e.g., bringing a phone close to a reader in a payment or ticketing application). The radio receiver may measure the respective signal strengths of the radio signals in the three advertising channels defined in the BLE™ standard. These channels typically have frequencies of 2402 MHz, 2426 MHz and 2480 MHz, corresponding to wavelengths of approximately 12.480 cm, 12.357 cm and 12.088 cm. It has been observed that radio signals with these wavelengths demonstrate measureable multipath fade effects over distances of 0.5-10 m. This makes these frequencies well suited for determining proximity on a scale that a human typically interacts with another human or with an appliance such as a vending machine or payment till.

The radio receiver may, of course, also receive radio signals on other frequency channels, other than the aforesaid plurality of frequency channels, but use these purely for data communication rather than for proximity detection.

The radio receiver may measure respective signal strengths for each frequency repeatedly at intervals, which may be regular intervals—e.g., five, ten, twenty, thirty or more times a second for each frequency. The signal-strength sampling rate may equal the transmission rate of the respective packets, such that one signal strength measurement is determined for each packet.

The radio receiver may be provided as part of a smart card (e.g. a SIM card or a UICC). In some embodiments the processing system is partially or entirely provided as part of a smart card. Providing the radio receiver and/or processing system within a smart card enables proximity determination functionality to be added to existing devices that have smart card capabilities (e.g. standard payment terminal device or mobile phones).

Due to its low power consumption, the Bluetooth™ protocol, particularly Bluetooth Low Energy (BLE)™, is particularly suited for battery powered devices, for example within a mobile phone. Accordingly, in some embodiments, the radio transmitter or radio receiver comprises a mobile device, e.g., handheld mobile device. Many consumer mobile devices are provided equipped with Bluetooth™ radio modules and as such using Bluetooth™ or BLE™ for proximity detection, as disclosed herein, requires little or no additional hardware. In addition Bluetooth™ modules within such mobile devices are often already continually powered, so using them for proximity detection need not increase power consumption.

Any suitable measure of statistical dispersion may be used, however preferably the measure of statistical dispersion is equal to, or representative of, variance or standard deviation. It could, however, be any other measure, such as the range or spread of the signal strengths (e.g., the maximum strength minus the minimum strength, optionally scaled by the maximum, minimum or mean signal strength over the plurality of frequency channels).

As mentioned above, the measure of statistical dispersion may be used as an indicator of transmitter-receiver proximity. However, differences in the measure of statistical dispersion may arise when different types or different configurations of transmitter and/or receiver are used (e.g. having different transmission powers, different components or different antennae sizes/shapes/configurations), even when the proximity of the transmitter and receiver is the same. For example, some cell phones have a non-uniform antenna response over frequency, so will exhibit a non-zero spread in signal strength across the frequency channels even when there is no multipath fading present. The inventors have thus recognised that in some embodiments it may be advantageous to also monitor the way that the dispersion changes over time (e.g. as the transmitter and receiver are brought closer together). This has been seen to provide a more consistent and/or reliable indicator of proximity over a wide range of transmitter and receiver types. In some embodiments therefore, the processing system is configured to evaluate a measure of statistical dispersion at intervals, and to analyse changes in the measure over time as part of proximity determination. Large changes in statistical dispersion may indicate that the transmitter and receiver are far apart, and small changes in statistical dispersion may indicate that the transmitter and receiver are near to each other. In some embodiments a measure of change in the measure of statistical dispersion over time (e.g. its trend or gradient over time, or its variance or standard deviation or spread over a rolling time window) is used when determining the information relating to proximity. The measure of change in statistical dispersion may, for example, be used in combination with an average signal strength.

In some embodiments, the information relating to the proximity may comprise a separation metric which is a function of any one, two, three or four of: the measure of statistical dispersion of the respective signal strengths over the plurality of frequency channels; a measure of change, over time, of said measure of statistical dispersion (e.g., its gradient); signal strength averaged across two or more of the frequency channels; and a measure of change, over time, of said frequency-averaged signal strength (e.g., its time derivative). The function may be a weighted sum of any one, two, three or four of these terms, or it may comprise the product or quotient of any two or more of these terms.

In some embodiments, the radio receiver may measure the respective signal strengths simultaneously. However, this may not typically be possible. For example, the BLE™ protocol does not allow transmission at multiple frequencies simultaneously and correspondingly, simultaneous detection and measurement is not possible. However, embodiments may be configured to measure the respective signal strengths in sequence; this may be done over a short time frame—e.g., less than 5-20 ms.

The methods described herein rely upon reflection of signals caused by objects and surfaces in the environment of the receiver and transmitter. Consequently, in some embodiments, the method further comprises calibrating to account for the environment. Performing a calibration may improve the accuracy of the proximity information, and may also allow for a quantified measurement of a transmitter-receiver separation distance. The calibration may comprise transmitting radio signals from the radio transmitter and receiving the radio signals at the radio receiver with the radio transmitter or radio receiver in a plurality of different positions in the environment. The signals may be transmitted on each of the plurality of frequency channels. The receiver may measure the respective signal strengths of the radio signals at each position. The processing system may be provided with data relating the statistical dispersion of the respective signal strengths to distance or proximity information for each of the positions.

Due to the sometimes variable nature of multipath fades, it may not be possible to generate a precise absolute value of separation distance, but rather the processing system may generate a probable separation distance, or it may generate merely a qualitative indication of being "potentially close", or a qualitative "near" or "far" binary determination. Other inputs may also be used when making such a determination, for example the transmitter and/or receiver may be provided on a device that comprises one or more other sensors (e.g. a magnetometer, accelerometer, GPS module, microphone, camera, light sensor, capacitive/photoelectric/inductive proximity sensor, angular rate sensor, inductive coils etc.), and additional sensor data provided by one or more of these sensors (e.g. gesture information from an accelerometer) may be utilised when generating said information relating to proximity. Combining said additional sensor data with the measure of statistical dispersion may improve proximity detection, and make it more uniform across a multitude of devices and environments.

One particularly beneficial application of the ideas outlined herein is within the field of payment systems. There are multiple means of payment available to consumers today, from physical cash to debit and credit cards, which are usually accompanied by a PIN or signature. However these methods can be slow and inconvenient and therefore alternative methods of payment have been developed, for example "contactless" payment systems, wherein payments are made without physical contact between a payment card or device and a payment terminal, often without the need for any authentication information for low-value payments. These types of payment method can be more convenient and faster than conventional payment methods.

Typical "contactless" payment systems utilise very short range RF communication protocols, e.g. Near Field Communication (NFC). These protocols require a payment card or device to be within a few centimetres of a payment terminal to process the transaction, and also require dedicated hardware within the payment card or device to operate. There is therefore a need for a payment system which has a longer operational range and which can use readily-available hardware.

Wireless payment methods have been proposed based upon short range radio protocols, such as Bluetooth™ which can support communications over distances of tens of metres. However when payments are conducted over this range the likelihood of confusion between payment devices increases and as such correctly identifying the intended payment device is important, to prevent erroneous payments being made. In a supermarket with several checkouts, for example, two payments being initiated as part of two separate transactions may be performed in close proximity and at similar times by two different customers, and it is important that the respective payment devices they use are not confused.

Some embodiments, therefore, further comprise the transmitter or receiver transferring data relating to a payment, for example an authentication token, when the information relating to the proximity satisfies a proximity criterion, which may be or comprise a maximum-separation threshold. Setting a reasonable separation threshold with consideration of the surrounding environment can minimise the chance of erroneous transactions being performed, while still enabling convenient payment.

The separation threshold may be not be set to a fixed value for all situations, but rather may depend on other factors (e.g. use case, time of day, location, average signal strength, information about a user). This increases the flexibility of the system to adapt to different environments and scenarios. In embodiments where data is transferred relating to a payment, the other factors may include details of said payment, e.g. a financial amount of the payment. For example a first maximum-separation threshold may be applied when a payment has a first value, and a second, higher maximum-separation threshold may be applied when a payment has a second, higher value.

Different actions may be associated with different separation thresholds. For example a first maximum-separation threshold may be applied to activate an application on a user device, and a second, higher maximum-separation threshold may be applied when a payment is performed using said application.

The applicant has appreciated there may be situations, in both payment scenarios and elsewhere, where it may be useful to determine which of a plurality of radio transmitters is closest to a radio receiver.

Accordingly, some embodiments of the method of controlling a radio system may further comprise:
   the radio receiver detecting radio signals from a plurality of radio transmitters;

the radio receiver measuring a respective signal strength of each of the radio signals; and the processing system evaluating, for each radio transmitter, a respective measure of statistical dispersion of the signal strengths over the respective plurality of frequency channels, and using the measures of statistical dispersion to identify a closest radio transmitter of the plurality of radio transmitters to the radio receiver.

This may comprise generating information relating to the proximity of each of the radio transmitters to the radio receiver and using said information to identify the closest radio transmitter of the plurality of radio transmitters to the radio receiver. The information may comprise a proximity value for each radio transmitter, and identifying the closest radio transmitter may comprise determining a highest or lowest proximity value from said proximity values.

Correspondingly, in some embodiments of the radio system:

the radio receiver is configured to detect the radio signals from a plurality of radio transmitters on respective pluralities of frequency channels (which may be the same or different across the radio transmitters);

the radio receiver is configured to measure a respective signal strength of each of the radio signals; and the processing system is configured to evaluate, for each radio transmitter, a measure of statistical dispersion of the respective signal strengths over the respective plurality of frequency channels, and to use the measures of statistical dispersion to identify a closest radio transmitter of the plurality of radio transmitters to the radio receiver.

The radio system may comprise the plurality of radio transmitters.

This approach can give a reliable identification of the closest radio transmitter, with minimal interference due to any intervening absorbing materials that may be located between the transmitters and the receiver.

This is particularly beneficial in a payment scenario, in which multiple payment devices are present, yet only the closest device to the payment terminal should process a payment. For example, in a supermarket only the customer at the front of a queue should pay for that customer's purchases.

The radio transmitters may all transmit on the same plurality of frequency channels, or at least two of the radio transmitters may transmit on different respective sets of frequency channels.

In other embodiments, there may instead be one radio transmitter and a plurality of receivers. Thus, the radio system may further comprise a plurality of radio receivers, wherein:

each of the radio receivers is configured to detect the radio signals from the radio transmitter;

each of the radio receivers is configured to measure respective signal strengths of the radio signals for each of the plurality of frequency channels; and the processing system is configured to evaluate, for each radio receiver, a measure of statistical dispersion of the respective signal strengths over the plurality of frequency channels, and to use the measures of statistical dispersion to identify a closest radio receiver of the plurality of radio receiver to the radio transmitter.

In this case, the processing system may receive data from each of the radio receivers representing the respective signal strengths of the radio signals received by the respective radio receiver. This data may be sent by radio, or any other suitable mechanism.

In any of the embodiments described herein, the processing system may be part of the radio receiver, or may be included with the radio receiver in a receiver device. In other embodiments, the processing system may be part of the radio transmitter, or may be included with the radio transmitter in a transmitter device. In this case, the receiver may be configured to communicate data representing the respective signal strengths to the radio transmitter. Alternatively, the processing system may be separate from the radio receiver. It may, for instance, comprise a remote server, with which the radio receiver may communicate over a wired or wireless connection. The radio receiver may be configured to communicate data representing the respective signal strengths to the processing system. In embodiments comprising a plurality of radio transmitters and/or radio receivers, the processing system may be distributed across one or more of the radio transmitters and/or radio receivers. I.e., some or all of the radio transmitter and/or radio receivers may comprise processing subsystems that together form part or all of the processing system. In some such embodiments one or more of the radio transmitters and/or radio receivers may be configured to communicate data representing one or more signal strengths to another of the radio transmitters and/or radio receivers—e.g., as data encoded in a radio message.

Suitable radio transmitters and receivers are already widely available, such as Bluetooth™ and BLE™ transmitters and receivers, meaning that some embodiments may be implemented by appropriate software executing on conventional mobile devices.

The concept of a proximity threshold-based payment system, based on analysing radio signals to assess proximity, is believed to be independently inventive.

Thus, from a further aspect, the invention provides a payment system comprising a first payment device and a second payment device, wherein the first payment device is configured to detect a radio signal from the second payment device; and wherein the payment system is configured to:

analyse the detected radio signal to determine if the first payment device and the second payment device meet a proximity condition; and use a communication channel between first payment device and the second payment device to process a payment transaction between the first and second payment devices when the first payment device and the second payment device meet said proximity condition.

From another aspect, the invention provides a method of operating a payment system comprising a first payment device and a second payment device, the method comprising:

the first payment device detecting a radio signal from the second payment device;

analysing the detected radio signal to determine if the first payment device and the second payment device meet a proximity condition; and using a communication channel between the first payment device and the second payment device to process a payment transaction between the first and second payment devices when the first payment device and the second payment device meet said proximity condition.

The detected radio signal may be analysed in any appropriate way to determine if the proximity condition is met. It may be analysed by the first payment device, or the first payment device may be configured to communicate data derived from the detected radio signal to the second payment device or to a remote processing system, which may be configured to analyse the data to determine if the first payment device and the second payment device meet a proximity condition.

In some embodiments, the payment transaction comprises the first payment device receiving a payment from the second payment device. Alternatively the payment transaction may comprise the second payment device receiving a payment from the first payment device.

The first payment device may be a static device, such as a payment till; however, it may be mobile. The second payment device may be mobile or static.

The communication channel may be a radio channel, an infrared channel, or any other channel. It may be a direct (e.g., peer-to-peer) channel between the first and second devices, or it may comprise a data network or another device.

In some embodiments, a time of flight of the radio signal may be measured. The proximity condition may specify a maximum time of flight.

In some embodiments, a signal strength of the radio signal may be measured. The proximity condition may specify a minimum signal strength.

In some embodiments, a plurality of radio signals are detected from the second payment device, on a plurality of frequency channels. A measure of statistical dispersion of the respective signal strengths over the plurality of frequency channels may be evaluated, as disclosed above. The proximity condition may specify a maximum dispersion. It may be defined with reference to information relating to a proximity of the first payment device to the second payment device, derived from the measure of statistical dispersion. Features of the earlier aspects and embodiments disclosed herein may be features of the first payment device and/or second payment device, where appropriate.

When the proximity condition is not met, the payment transaction may be blocked from occurring. The proximity condition may effectively establish a zone around the terminal system outside which the payment transaction will not be processed. Within the zone, the payment transaction can be processed—optionally subject to other conditions being met, such as a password or a biometric identifier being validated.

At least one of the first payment device and the second payment device may be a single device. However, it may be distributed. It may comprise a payment device and a processing system which may be separate from the payment device (e.g., a remote server). The processing system may analyse the detected radio signal and/or process the payment transaction. In embodiments where the first payment device comprises a payment device and a remote processing server, the payment device may comprise a radio receiver for detecting the radio signal. In such embodiments the proximity condition is preferably defined relative to the payment device, not the remote processing server.

In some embodiments, the proximity condition comprises a requirement that the second payment device be a closest payment device, of a plurality of payment devices, to the first payment device. The first payment device may be configured to analyse detected radio signals from a plurality of payment devices, and may identify a closest of the plurality of payment devices to the first payment device.

It will be appreciated that the processing system and devices described herein may comprise any one or more of: CPUs, DSPs, ASICs, analogue circuitry, volatile memory, non-volatile memory, power supplies, inputs, outputs, and any other appropriate components. Some or all of the processing steps disclosed herein may be carried out in hardware or in software or a combination of these.

Features of any aspect or embodiment described herein may, wherever appropriate, be applied to any other aspect or embodiment described herein. Where reference is made to different embodiments or sets of embodiments, it should be understood that these are not necessarily distinct but may overlap.

BRIEF DESCRIPTION OF THE DRAWINGS

Certain preferred embodiments of the invention will now be described, by way of example only, with reference to the accompanying drawings, in which.

DETAILED DESCRIPTION OF THE PREFERRED EMBODIMENTS

Figure 1:
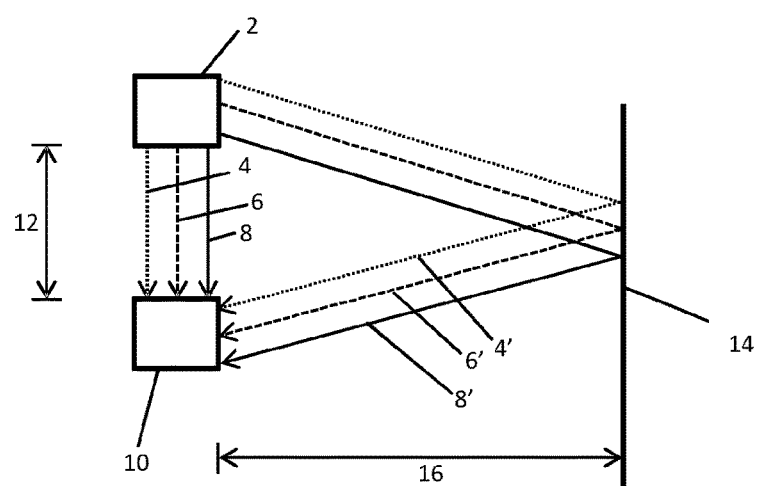
FIG. 1 is a schematic drawing of a transmitter and receiver, embodying the invention, in close proximity to each other.

FIG. 1 shows a radio transmitter 2, a radio receiver 10, and a reflective surface 14, such as a wall.

The radio transmitter 2 broadcasts first, second and third radio signals 4, 6, 8 in turn, with equal power, according to the Bluetooth™ Low Energy (BLE)™ protocol. The radio transmitter 2 may be a cell phone or other mobile device. The first, second and third radio signals 4, 6, 8 have carrier frequencies of 2402 MHz, 2426 MHz and 2480 MHz respectively, corresponding to the three advertisement channels according to the BLE™ protocol. The radio transmitter 2 may make these broadcasts at a rate of around thirty transmissions per second (30 Hz) on each frequency.

The radio receiver 10 is positioned at a transmitter-receiver distance 12 from the transmitter 2 and is configured to receive the first, second and third radio signals 4, 6, 8. The reflective surface 14, such as a floor, ceiling, wall, or face of an object such a table, is situated at a distance 16 from the transmitter 2 and receiver 10, the reflector distance 16 being much greater than the transmitter-receiver distance 12. There may, of course, be further reflective surfaces in the environment, which are omitted for the sake of simplicity.

The radio signals 4, 6, 8 are broadcast in all directions from an antenna of the transmitter 2. Certain paths are represented as lines in FIG. 1, but the position and spacing of these lines is for schematic convenience only. The receiver 10 receives not only directly transmitted radio signals 4, 6, 8, but also reflected signals 4', 6', 8' that have been reflected from the reflective surface 14. The paths travelled by the reflected signals 4', 6', 8' and the directly transmitted signals 4, 6, 8 are of different lengths, and as such the two sets of signals interfere.

The receiver 10 therefore, receives signals on three frequency channels, which each comprises a superposition of a directly transmitted signal 4, 6, 8 and at least one reflected signal 4',6',8'. In practice, the receiver 10 is likely to receive many reflections off many surfaces in the environment on each channel. The received signals each have an intensity, or strength, which the receiver 10 is configured to measure, to obtain a received signal-strength indication (RSSI) for each frequency channel. These values may be updated continually, at intervals (e.g., thirty times a second for each advertising frequency), as successive signals are received by the receiver 10. Because the signals 4, 6, 8 have different wavelengths, they interfere constructively and/or destructively to differing degrees, based on the lengths of the identical direct and reflected paths travelled by the signals 4, 6, 8.

Figure 2:
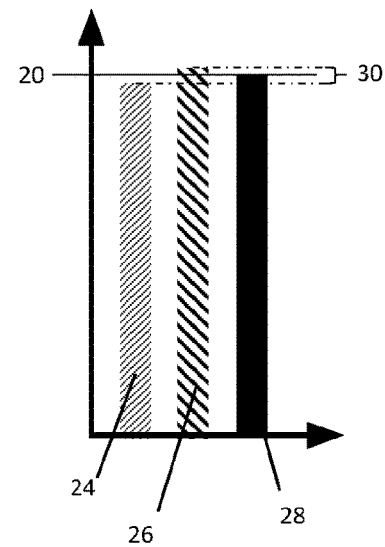
FIG. 2 is a graph of intensities measured by the receiver when positioned as in FIG. 1.

FIG. 2 is a graph showing illustrative intensities 24, 26, 28 of the first, second and third signals 4, 6, 8, respectively, that might be measured by the receiver 10. The measured intensities 24, 26, 28 have a mean value 20, and a spread 30. Because the reflector distance 16 is much greater than the transmitter-receiver distance 12, the intensities of the reflected signals 4', 6', 8' at the receiver 10 are much smaller than those of the directly transmitted radio signals 4, 6, 8; therefore the resultant interference does not cause large levels of dispersion in the measured intensities 24, 26, 28. The average intensity 20 is relatively high, as the transmitter-receiver distance 12 is relatively small, and the spread 30, indicative of the statistical dispersion across the frequency channels, is relatively small, because of the minor impact of interference from the reflected signals 4', 6', 8'.

Figure 3:
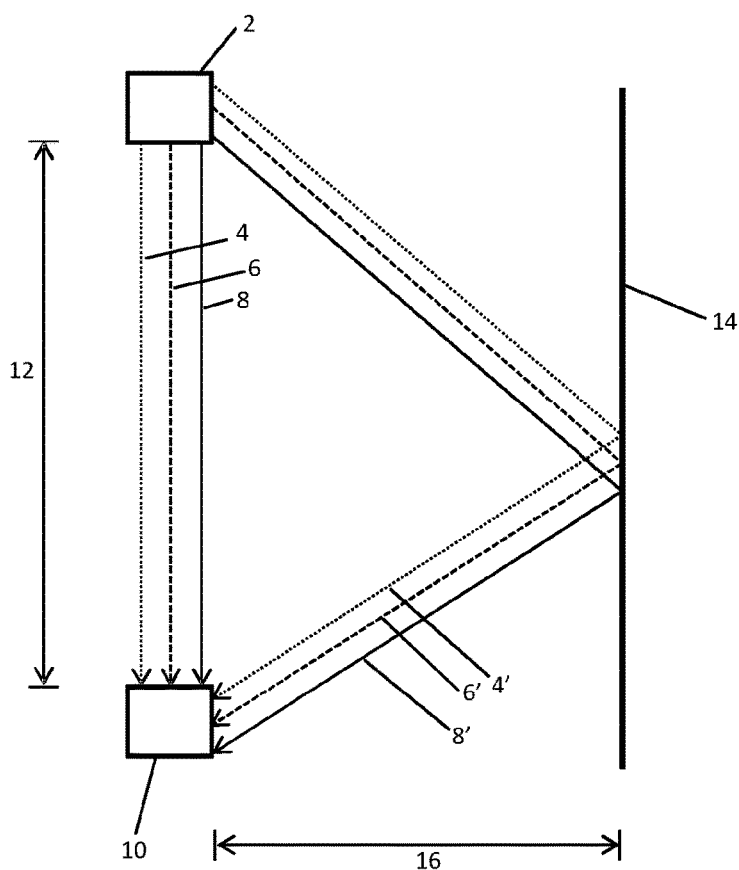
FIG. 3 is a schematic drawing of the transmitter and receiver when they are further apart from each other.

FIG. 3 depicts the same radio transmitter 2 and radio receiver 10, but spaced apart by a greater transmitter-receiver distance 12, such that the transmitter-receiver distance 12 is comparable to the reflector distance 16.

As before, radio signals 4, 6, 8 are broadcast, in rotation, in all directions from the transmitter 2. The receiver 10 receives both directly transmitted radio signals 4, 6, 8 and reflected signals 4', 6', 8' that have been reflected from the reflective surface 14.

However, in contrast to the situation illustrated in FIG. 1, because the transmitter-receiver distance 12 is comparable to the reflector distance 16, the intensities of the reflected signals 4', 6', 8' are similar to those of the directly transmitted signals 4, 6, 8. The impact of interference intensities as measured by the receiver 10 is therefore much greater than in the scenario illustrated in FIGS. 1 and 2.

Figure 4:
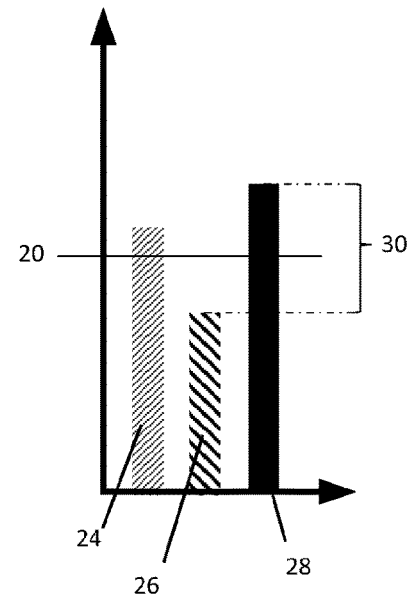
FIG. 4 is a graph of intensities measured by the receiver when positioned as in FIG. 3.

FIG. 4 is a graph showing example intensities 24, 26, 28 of the first, second and third signals 4, 6, 8 respectively, as might expect to be measured by the receiver for the scenario shown in FIG. 3. The measured intensities 24, 26, 28 have a mean value 20 that is lower than that in FIG. 2, because the transmitter-receiver distance 12 in FIG. 3 is greater than it was in FIG. 1. As explained above, the impact of interference is greater when the transmitter-receiver distance 12 is comparable to the reflector distance 16, and as such the spread 30 of the measured intensities is greater than that seen in FIG. 2.

A fractional dispersion in the measured intensities 24, 26, 28 may be calculated by dividing the spread 30 by the mean intensity 20. Fractional dispersion may be a more robust indicator of proximity of the receiver 10 to the transmitter 2 than the absolute value of the spread 30, especially, as will be explained below, if attenuating materials are present. Instead of calculating an absolute or scaled spread 30, as a measure of statistical dispersion, the receiver 10 may calculate the variance or standard deviation, or any other appropriate measure of dispersion, from the RSSI values.

The receiver 10 can use the dispersion over the frequency channels 4, 6, 8 to determine how close it is to the transmitter 2, or to determine when it satisfies a proximity condition such as being within a threshold separation distance from the transmitter 2. It will be appreciated that the dispersion measure may be only loosely correlated with the separation distance 12, so an accurate, quantified distance (e.g., in metres) may not always be obtainable. Nevertheless, this approach can provide a useful indication of proximity at much lower cost than a time-of-flight measuring device. The receiver 10 may also make use of the mean signal strength 20, independently of the dispersion, as an input to a proximity-determination algorithm. However, the utility of this value, on its own, may be limited, as explained below.

A calibration operation may optionally be performed using the same apparatus as seen in FIGS. 1 and 3, by varying the transmitter-receiver distance 12 and observing the resulting dispersion across the measured intensities 24, 26, 28 at different distances. A look-up table of dispersions against distances can be generated from these data. The receiver 10 may therefore use a look-up table to enable quantified proximity determination based on the intensities of received signals (although there may be a significant error margin in the measurements).

An advantage of the approach disclosed herein is the reliability of the proximity information determination even when there are attenuating materials present.

Figure 5:
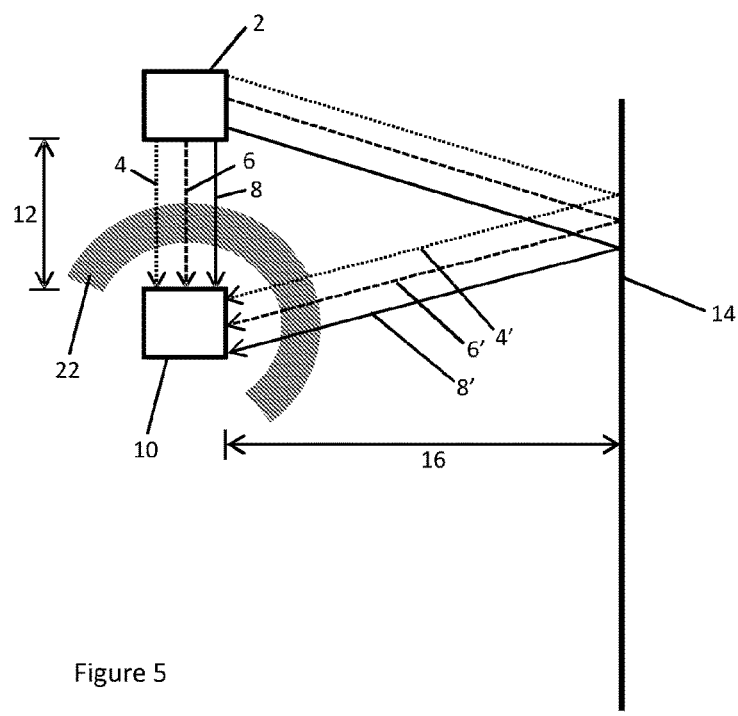
FIG. 5 is a schematic drawing of the transmitter and receiver in close proximity with intervening attenuating material.

FIG. 5 depicts a scenario in which a region of material 22 that significantly attenuates radio energy at frequencies around 2.4 GHz is disposed around the receiver 10. The material 22 could, for example, be the user's hand, gripping around the antenna of a cell phone embodying the receiver 10. This reduces the power of both the directly transmitted signals 4, 6, 8 and the reflected signals 4', 6', 8'.

Figure 6:
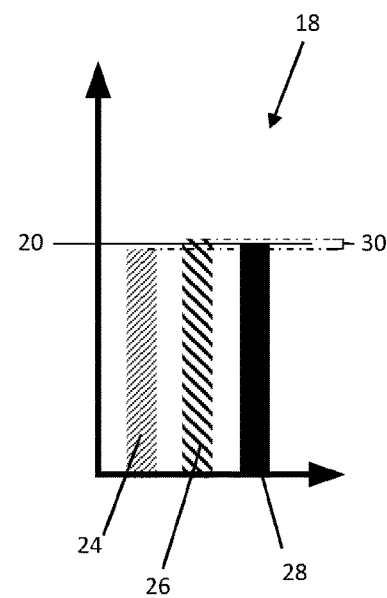
FIG. 6 is a graph of intensities measured by the receiver when positioned as in FIG. 5.

FIG. 6 is a graph showing example measured intensities 24, 26, 28 as might be measured by the receiver 10 for the scenario in FIG. 5. The directly transmitted signals 4, 6, 8 are attenuated by the attenuating material 22 such that their intensity at the receiver 10 is significantly reduced compared to the scenario illustrated in FIG. 1. The reflected signals 4', 6', 8' are similarly attenuated such that the effect of interference is still minor and the statistical dispersion is small. In this particular example, the mean value 20 of the measured intensities 24, 26, 28 is equal to the mean measured intensity 20 for the scenario depicted in FIGS. 3 and 4. This shows why the mean intensity level 20 can be a poor indicator of the transmitter-receiver distance 12 as it cannot distinguish between the scenarios in FIGS. 3 and 5, despite the large difference in transmitter-receiver distance 12. In general, therefore, in an environment with surfaces that are significantly reflective to radio waves, signal intensity alone, on one frequency channel or averaged over multiple channels, correlates poorly with transmitter-receiver separation.

However, by measuring the level of dispersion in the measured intensities 24, 26, 28 (indicated here by the spread 30), it is possible to determine the transmitter-receiver distance 12 much more reliably (i.e., with less error), even when attenuating materials 22 are present.

Figure 7:
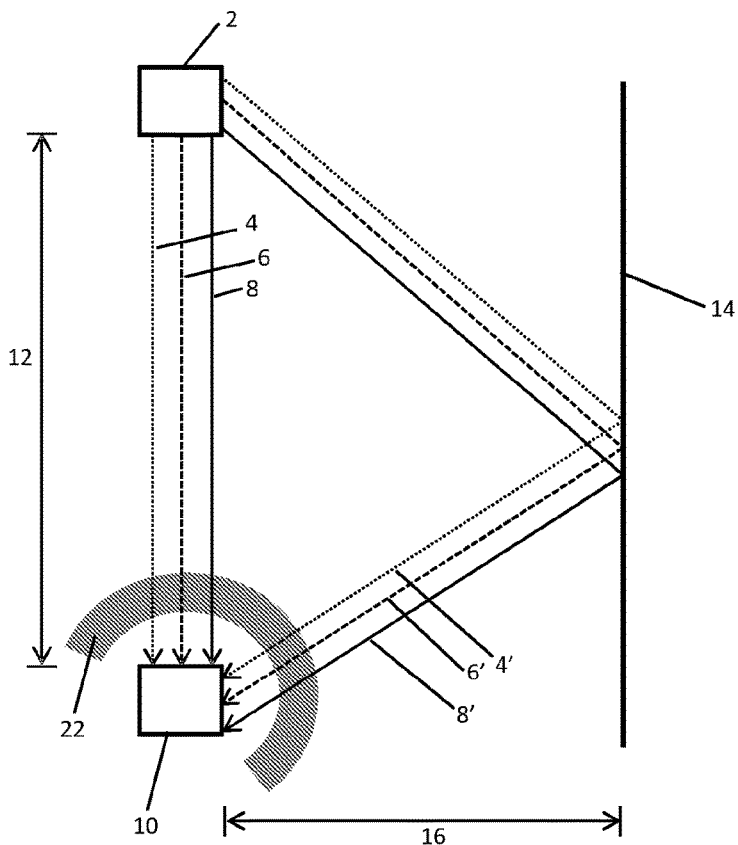
FIG. 7 is a schematic drawing of the transmitter and receiver when they are further apart, with intervening attenuating material.
Figure 8:
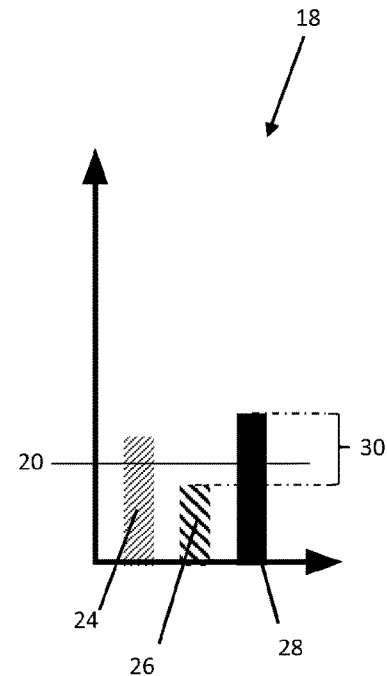
FIG. 8 is a graph of intensities measured by the receiver when positioned as in FIG. 7.

FIG. 7 shows a scenario in which a region of attenuating material 22 is disposed around the receiver 10, impacting both the directly transmitted signals 4, 6, 8 and the reflected signals 4', 6', 8' for a relatively large transmitter-receiver distance 12, in which the transmitter-receiver distance 12 and the reflector distance 16 are comparable. FIG. 8 is a graph showing example intensities 24, 26, 28 of the first, second and third signals 4, 6, 8 respectively, as might be measured by the receiver 10 for the scenario shown in FIG. 7.

When the transmitter-receiver distance 12 is increased, as in FIG. 7, the spread (shown in FIG. 8) in the measured intensities 24, 25, 26 increases. Because the reflected signals 4', 6',8' and the directly transmitted signals 4, 6, 8 are all similarly attenuated (causing the same fractional decrease in intensity), the fractional dispersion observed is roughly equivalent to that seen in the scenario shown in FIG. 2 (i.e. it is largely unaffected by the presence of the attenuating material 22), and as such provides a robust indicator of the transmitter-receiver distance 12.

Figure 9:
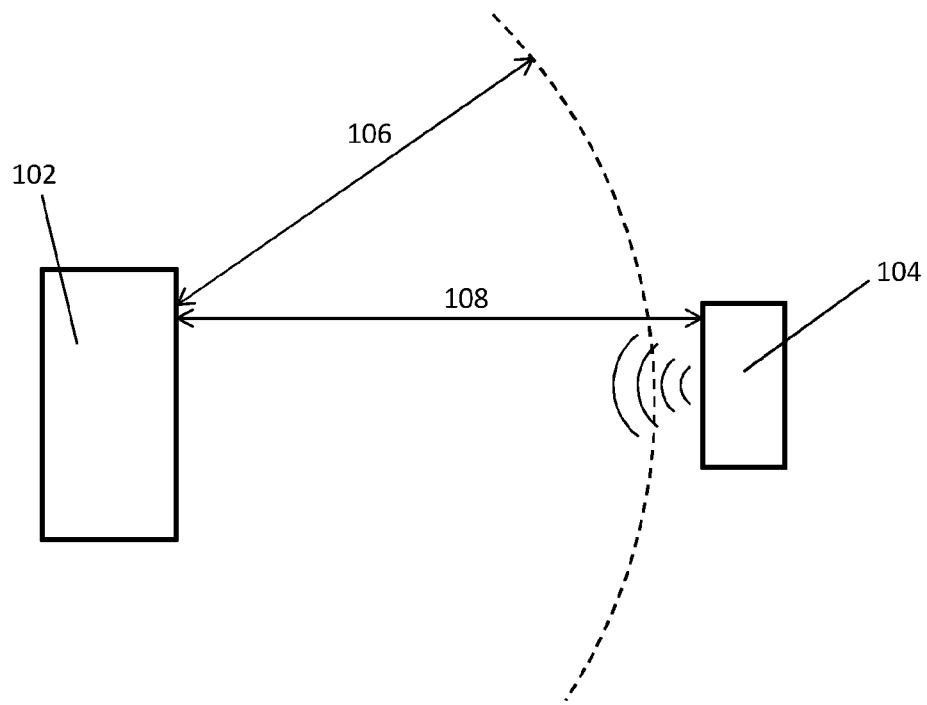
FIG. 9 is a schematic drawing of a second transmitter and receiver, embodying the invention, as part of a proximity-threshold-based payment system.

One particularly beneficial application of the ideas outlined herein is within the field of payment systems. FIG. 9 illustrates the operation of a proximity-threshold-based payment system using a payment terminal 102 and a mobile payment source device 104. The payment terminal 102 may be static (e.g., mounted on a shop counter), or may be mobile (e.g., carried by a waiter in a restaurant). The payment terminal 102 comprises a receiver and processing system similar to that described above, while the mobile payment source device 104 comprises a transmitter similar to that described above. Of course, the devices 102, 104 preferably also support two-way radio communication.

A user (not shown), wishing to perform a payment, presents the payment source device 104, which is a device-distance 108 away from the payment terminal 102. The user initiates a payment transaction on the device 104 through an appropriate user interface (although this may instead be automatic and require no user input). The payment source device 104 transmits a plurality of radio signals on a plurality of frequency channels, which are detected by the payment terminal 102. The payment terminal 102 analyses the detected radio signals to determine whether the payment source device 104 meets a proximity condition, which in this case corresponds to a maximum separation threshold 106. The analysis performed by the payment terminal 102 comprises measuring signal strengths of the radio signals in each of the plurality of frequency channels, and evaluating a measure of statistical dispersion of the respective signal strengths. As explained earlier, the dispersion of the respective signal strengths can be a relatively-robust measure of the proximity, assuming there are appropriate reflective surfaces in the vicinity of the device 102, 104, which will typically be the case (e.g., the floor or ground will usually significantly reflect radio frequencies). The dispersion is used by the payment terminal 102 to determine whether or not the maximum separation distance 108 is met.

Figure 10:
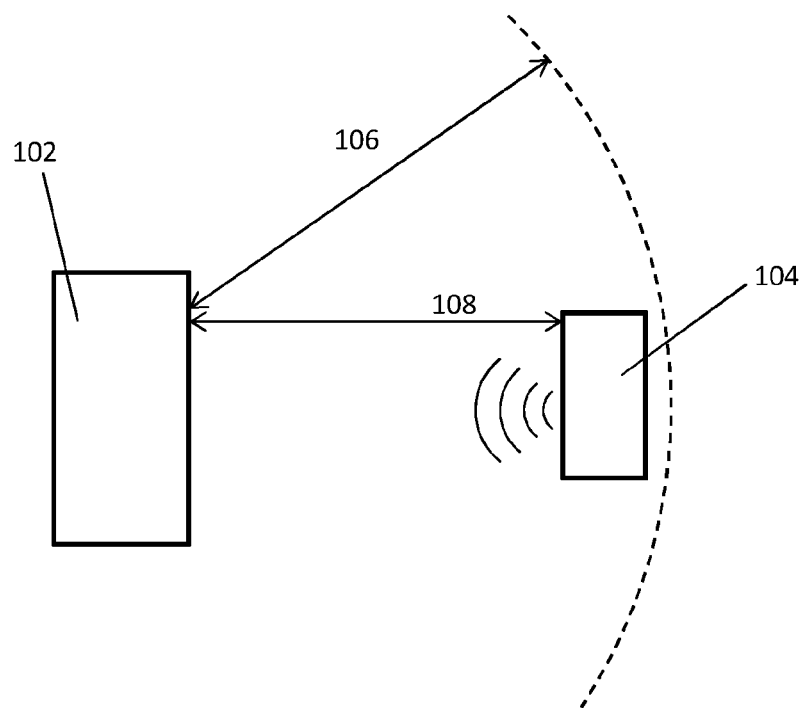
FIG. 10 is a schematic drawing of the second transmitter and receiver closer together.

Should the payment terminal 102 determine that proximity condition is met, it performs a data exchange with the payment source device 104 in order to process the payment transaction. The data transferred may comprise, for example, an authentication token. The payment terminal 102 may communicate with a remote system, such a bank server, or may process the transaction locally. In FIG. 9, the device distance 108 exceeds the maximum separation distance 106 and accordingly no such data transfer is performed and the payment is not processed. In FIG. 10, however, the payment source device 104 is within the maximum separation distance 106, for example due to the user having moved the payment source device 104 closer to the payment terminal 102. The payment terminal 102 periodically analyses the detected radio signals, and detects that the payment source device 104 now meets the proximity condition, based on the statistical dispersion across the frequencies dropping below a threshold level, and initiates the processing of the payment.

Figure 11:
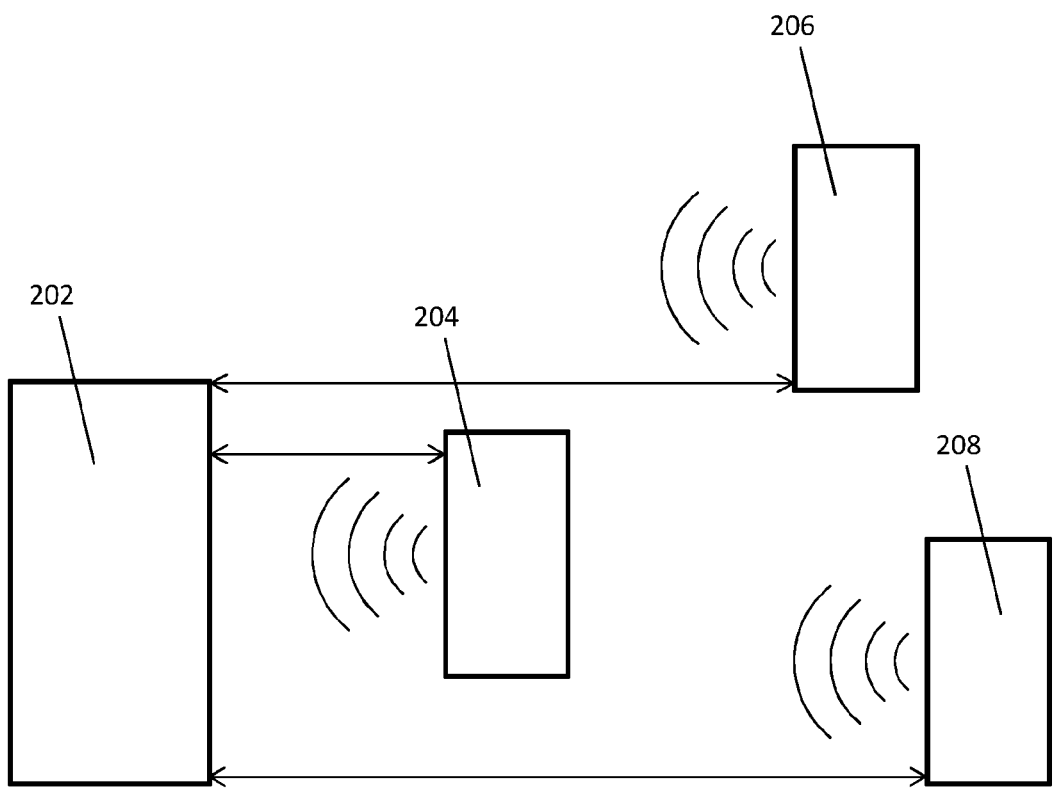
FIG. 11 is a schematic drawing of a third transmitter and receiver, embodying the invention, as part of another payment system.

In some payment scenarios, there may be multiple payment source devices near to a payment terminal device. FIG. 11 illustrates a scenario in which first, second and third payment source devices 204, 206, 208 are located at a plurality of distances from a payment terminal 202. It is desired that only the first payment source device 204, which is closest to the payment terminal 202, processes the payment. This may be, for example, because each of the payment source devices 204, 206, 208 belongs to a different respective shopper, standing in a single line while queuing to pay for their respective purchases in a shop. Only the user at the front of the queue, who is carrying the first payment source device 204 and is nearest the payment terminal 202 (which may be a component of a till) is attempting to pay for their purchases.

The payment terminal 202 receives radio signals in a plurality of frequency channels from each of the payment source devices 204, 206, 208. For reasons explained earlier, because the second and third payment source devices 206, 208 are farther away from the payment terminal than the first payment source device 204, the dispersion seen in the signal strengths of the radio signals received from the second and third payment source devices 206, 208 is expected to be greater than that seen for the first payment source device 204. The payment terminal 202 therefore evaluates a measure of statistical dispersion of the respective signal strengths for each of the payment source devices 204, 206, 208, over the frequency channels. It determines that the first payment source device 204 has the lowest dispersion and infers that it is the closest source device 204 to the payment terminal 202. The payment terminal 202 consequently performs a radio data exchange with the first payment source device 204 in order to facilitate processing of a payment.

Figure 12:
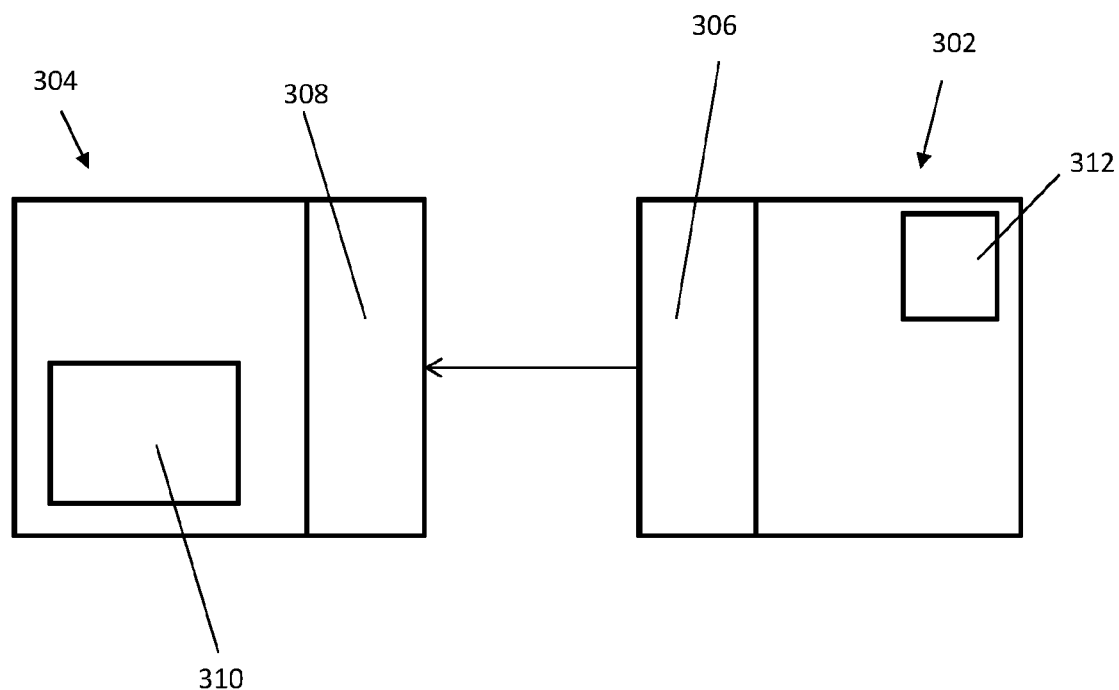
FIG. 12 is a schematic drawing of a fourth embodiment of a transmitter and receiver.

FIG. 12 shows a schematic diagram of a transmitter device 302 and a receiver device 304 according to one set of embodiments. The transmitter device 302 comprises a radio transmitter module 306 and a sensor module 307. The receiver device 304 comprises a radio receiver module 308, and a processing module 310. The radio transmitter module 306 and the radio receiver module 308 may comprise suitable radio transmitters and receivers as known in the art, and although not shown, may comprise conventional components such as antennae, amplifiers, and filters. The radio transmitter module 306 and the radio receiver module 308 may be Bluetooth™ or BLE™ radio modules. The processing module 310 may comprise conventional components—for example a CPU, a memory, and one or more inputs and/or outputs. The devices 302, 304 may also include power supplies, such as batteries (not shown), user interfaces, inputs, outputs, etc.

In use, the transmitter device 302 transmits radio signals on a plurality of frequency channels via the radio transmitter module 306. The receiver device 304 detects the radio signals via the radio receiver module 308. The processing module 310 evaluates a measure of statistical dispersion of the respective signal strengths over the plurality of frequency channels and determines information relating to a proximity of the radio transmitter device 302 to the radio receiver device 304. The processing module 310 may use this to determine whether to execute a particular function, such as making a data transfer, or sounding an alarm. The sensor module 307 outputs sensor data, for example the sensor module 307 may comprise an accelerometer that outputs data indicating movement of the transmitter device 302. This sensor data is transmitted to the processing module 310 and may be used when determining whether to execute the particular function. For example, data transfer may only take place if accelerometer data indicates that the transmitter device 302 is stationary/not accelerating.

Figure 13:
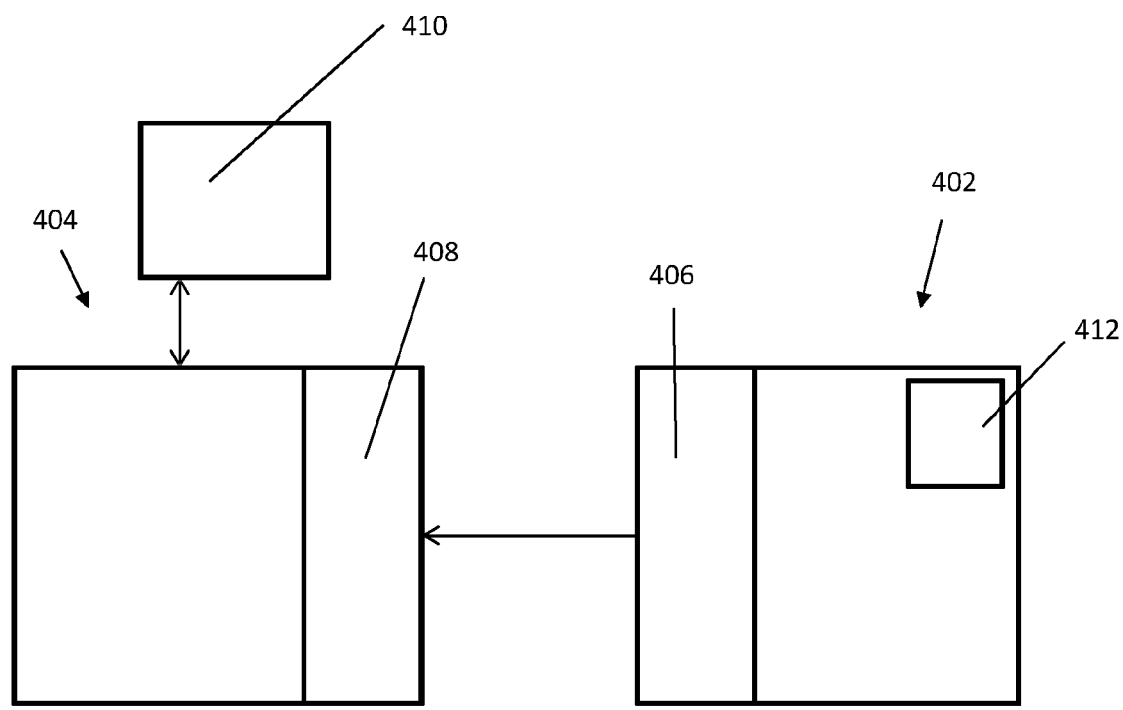
FIG. 13 is a schematic drawing of a fifth embodiment of a transmitter and receiver.

FIG. 13 shows an alternative set of embodiments of a transmitter device 402, having a radio transmitter module 406 and a sensor module 407, and a receiver device 404, having a radio receiver module 408. In these embodiments, the processing module 410 is a separate device, e.g. a remote server, which is in communication with the receiver device 404. The receiver device 404 may, of course, comprise its own processing logic (not shown).

Figure 14:
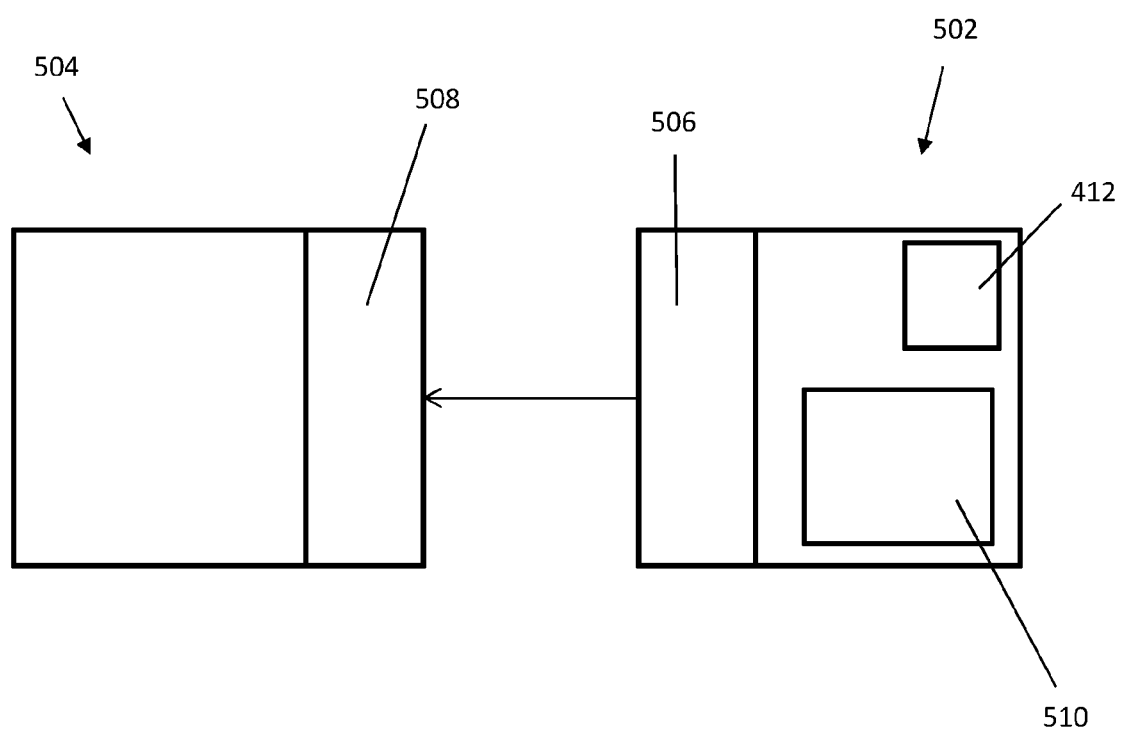
FIG. 14 is a schematic drawing of a sixth embodiment of a transmitter and receiver.

FIG. 14 shows a further set of embodiments of a transmitter device 502, having a radio transmitter module 506 and a sensor module 507, and a receiver device 504, having a radio receiver module 508. In these embodiments, the processing module 510 is part of the transmitter device 502 (e.g., in a common housing, or integrated on a common semiconductor substrate).

Any of the architectures shown in FIGS. 12, 13 and 14 may be used in any of the embodiments described herein.

FIGS. 15A-15D show representative graphs (not to scale, and not based on actual data) that illustrate the operation, in a hypothetical scenario, of a radio system embodying the invention, comprising a radio transmitter and a radio receiver (such as those illustrated in FIGS. 9 and 10). The system is arranged to determine if and/or when a separation between transmitter and receiver meets and/or exceeds a predetermined proximity criterion. The system may, for example, comprise a proximity-based payment system made up of a payment device (e.g. comprising the transmitter) and a payment terminal (e.g. comprising the receiver), where a payment is only performed by the payment device and the payment terminal when the separation between the payment device and the payment terminal is determined to have dropped below a threshold value.

Figures 15A, 15B, 15C, 15D:
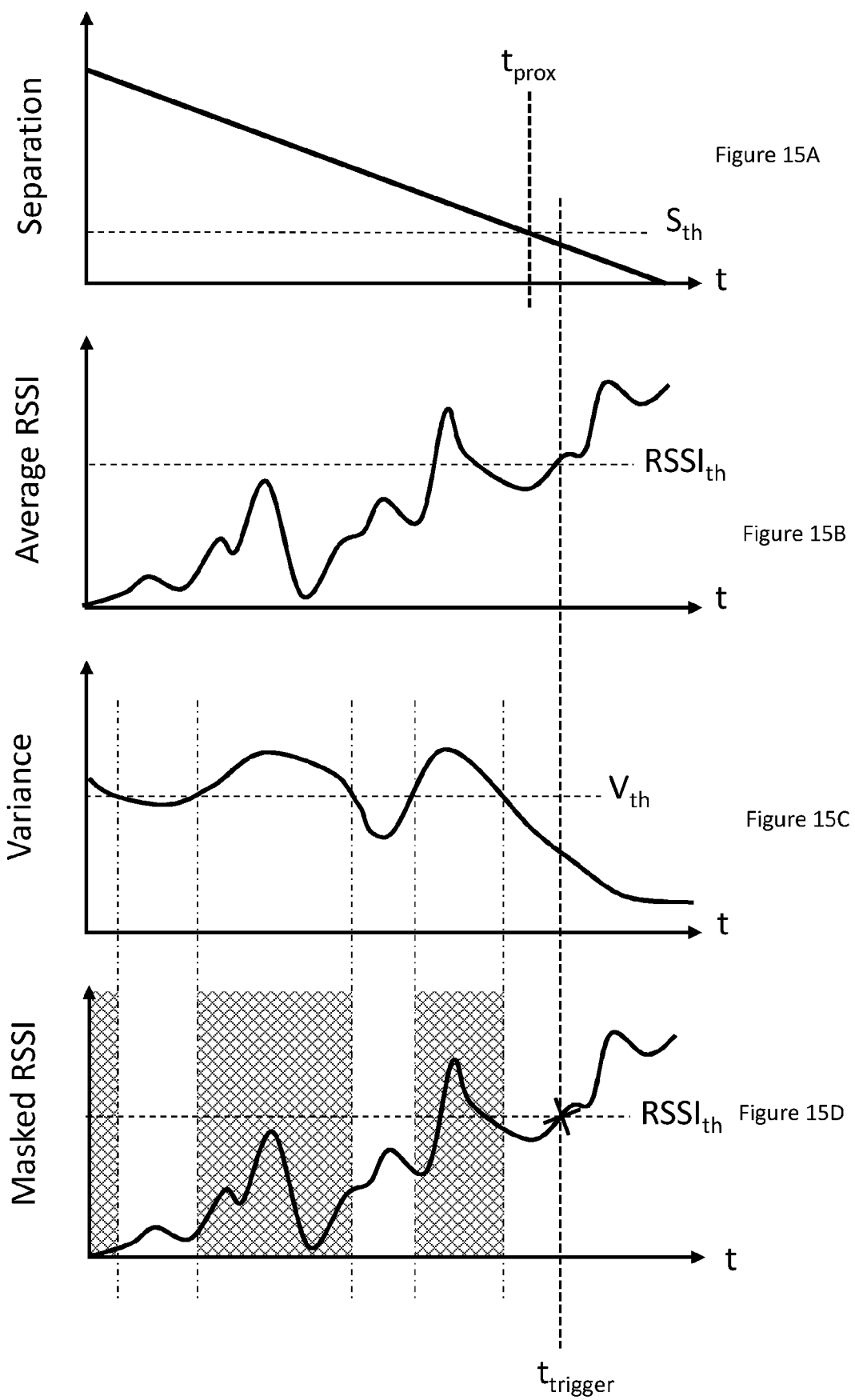
FIGS. 15A-15D are time-aligned plots of—respectively—separation, average RSSI, variance and masked RSSI, in a first hypothetical use case, over time.

The transmitter and receiver are separated by a separation distance, as shown in FIG. 15A. The transmitter and receiver are moved towards each other (e.g. so as to initiate a payment) such that the separation distance decreases over time. At a time $t_{prox}$, it drops below a threshold separation $S_{th}$.

The transmitter broadcasts a plurality of radio signals on a corresponding plurality of different frequency channels (e.g. on three Bluetooth Low Energy (BLE)™ advertising channels). The receiver receives these signals and monitors (e.g. by sampling repeatedly) the strength of each signal to generate a time series of received signal-strength indications (RSSIs) for each frequency channel. The receiver calculates a time series of average RSSIs (over all three frequencies) which is shown in FIG. 15B. It can be seen that the average RSSI fluctuates (e.g. due to multipath effects and/or a changing orientation of the mobile device), but generally increases over time (as the separation distance decreases).

The receiver also calculates, at intervals, a measure of statistical dispersion of the RSSIs across the frequencies (in this case the variance, although other measures may be used).

FIG. 15c shows how this measure changes over time as the receiver-transmitter separation decreases. The variance fluctuates (e.g. due to differential frequency-dependent multipath effects), but generally decreases over time.

As mentioned above, the average RSSI generally increases as the separation distance decreases. However, the fluctuations in the average RSSI (e.g. due to multipath effects) make it difficult to use this as a reliable indicator of proximity. E.g., in the hypothetical scenario illustrated in FIGS. 15A-D, the average RSSI would pass a threshold value $RSSI_{th}$ (e.g. predetermined to correspond with a threshold proximity based on typical RSSI behaviour) well before the threshold separation $S_{th}$ was actually met.

Therefore, in order to more reliably determine when the separation drops below the threshold value, the system applies a mask (i.e. zero weighting) to the average RSSI using the measure of statistical dispersion. Time periods in which the variance exceeds a predetermined threshold value $V_{th}$ are identified (shown with hatching in FIG. 15D), and a masked RSSI (shown in FIG. 15D) is generated which does sets the RSSI measurements to zero in these identified time periods.

The system determines if the proximity criterion is met by comparing the masked RSSI, at intervals, to the threshold value $RSSI_{th}$. FIG. 15D shows that this $RSSI_{th}$ is reached at $t_{trigger}$, which is close to the time, $t_{prox}$, at which the separation threshold is actually met. Thus, by masking average RSSI values at times when the variance is above $V_{th}$, earlier misleading peaks in the average RSSI are not considered and the system more accurately determines when the proximity criterion is met.

FIGS. 16A-D show another radio system embodying the invention, arranged to determine if and/or when a separation between transmitter and receiver meets and/or exceeds a predetermined proximity criterion (such as a proximity-based payment system).

Figures 16A, 16B, 16C, 16D:
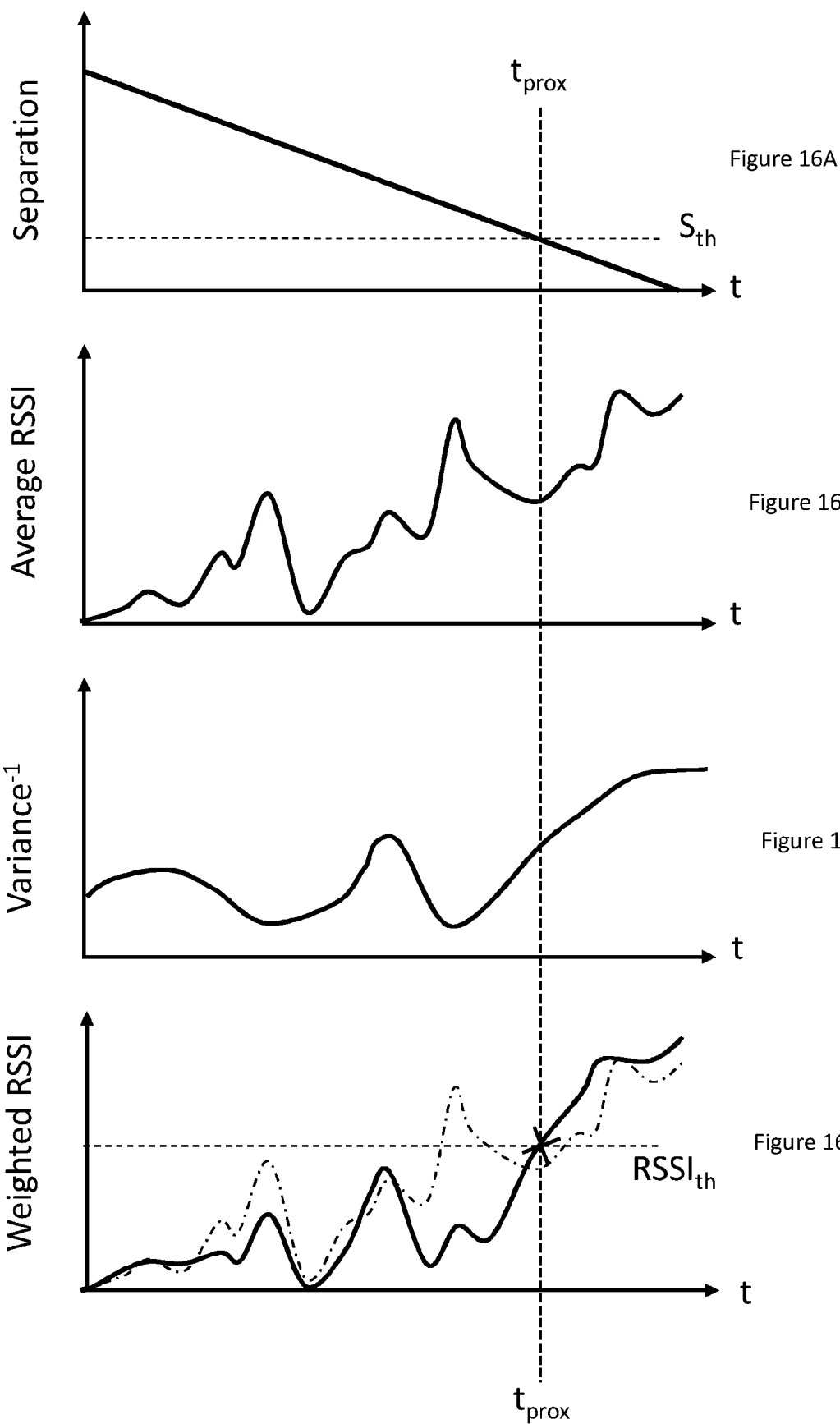
FIGS. 16A-16D are time-aligned plots of—respectively—separation, average RSSI, inverse variance and weighted RSSI, in a first hypothetical use case, over time.

The transmitter and receiver are separated by a separation distance as shown in FIG. 16A. The transmitter and receiver are moved towards each other (e.g. so as to initiate a payment) such that the separation distance decreases over time. At a time $t_{prox}$, it drops below a threshold separation $S_{th}$.

As with the system described with reference to FIGS. 15A-D, the transmitter broadcasts a plurality of radio signals in a corresponding plurality of different frequency channels and the receiver receives these signals. The receiver monitors (e.g. by sampling repeatedly) the strength of each signal to generate a time series of received signal-strength indications (RSSIs) for each frequency channel. The receiver calculates a time series of average RSSIs (over all frequencies) which is shown in FIG. 16B. The average RSSI fluctuates, but generally increases over time (as the separation distance decreases).

The receiver also calculates a measure of statistical dispersion of the RSSIs (the variance) at intervals. FIG. 16D shows an inverse of this measure which fluctuates (e.g. due to varying frequency-dependent multipath effects), but generally increases over time as the separation reduces.

The receiver calculates a weighted RSSI, shown with the solid line in FIG. 16D. The "non-weighted" average RSSI is also shown for reference in FIG. 16D with a dot-dash line. The weighted RSSI is the product of the inverse variance (FIG. 16C) and the average RSSI (FIG. 16B). The average RSSI is thus suppressed in time periods of high variance (i.e. when the average RSSI is a poor indicator of separation) and amplified in time periods of low variance (i.e. where the average is a good indicator of separation).

The system determines if the proximity threshold is met by comparing the weighted RSSI to a threshold value $RSSI_{th}$ (e.g. based on previous weighted RSSI behaviour), shown with a dashed line in FIG. 16D. This is met at time $t_{prox}$. It can be seen that combining the average signal strength and the signal strength dispersion to produce the weighted RSSI may enable the system to more accurately determine when the separation threshold is met than using either of these measures independently; it may also, at least in some situations, be a more useful approach than the masking method explained above with reference to FIGS. 15A-D.

It will be appreciated by those skilled in the art that the invention has been illustrated by describing one or more specific embodiments thereof, but is not limited to these embodiments; many variations and modifications are possible, within the scope of the accompanying claims.

The invention claimed is:

1. A radio system comprising a radio receiver and a processing system, wherein:
the radio receiver is configured to detect radio signals transmitted from a radio transmitter on a plurality of frequency channels, and to measure respective signal strengths of the radio signals for each of the plurality of frequency channels; and
the processing system is configured:
to evaluate a measure of statistical dispersion of the respective signal strengths over the plurality of frequency channels, and
to use an average of the respective signal strengths of radio signals in the plurality of frequency channels, in combination with the measure of statistical dispersion to determine information relating to a proximity of the radio transmitter to the radio receiver, said information comprising a separation metric that increases with increasing geometrical distance between the radio transmitter and the radio receiver and decreases monotonically with decreasing statistical dispersion for at least some average signal strengths.

2. The radio system of claim 1, wherein the processing system is configured to apply a weight to the average of the respective signal strengths, when determining the information relating to the proximity of the radio transmitter to the radio receiver, wherein the weight depends on the measure of statistical dispersion.

3. The radio system of claim 1, wherein the processing system is configured to determine a separation metric that decreases monotonically with decreasing statistical dispersion for some or all values of average signal strength, and that decreases monotonically with increasing average signal strength for some or all values of statistical dispersion.

4. The radio system of claim 1, wherein the processing system is configured to evaluate a measure of change in the measure of statistical dispersion, over time, when determining the information relating to the proximity of the radio transmitter to the radio receiver.

5. The radio system of claim 1, wherein the radio receiver is configured to transmit data to or receive data from the radio transmitter in response to the information relating to the proximity of the radio transmitter to the radio receiver satisfying a proximity criterion.

6. The radio system of claim 5, wherein said data relates to a payment.

7. The radio system of claim 5, wherein the radio receiver comprises an antenna that the radio receiver is configured to use both for receiving the aforesaid radio signals on the plurality of frequency channels and for transmitting or receiving said data.

8. The radio system of claim 1, wherein the measure of statistical dispersion is equal to, or representative of, variance or standard deviation or spread.

9. The radio system of claim 1, further comprising at least one sensor which is configured to provide additional sensor data, wherein the radio system is configured to utilise said additional sensor data when generating said information relating to proximity.

10. The radio system of claim 9, wherein the at least one sensor comprises an accelerometer, and the additional sensor data comprises gesture information.

11. The radio system of claim 1, wherein the radio system comprises the radio transmitter.

12. The radio system of claim 1, wherein the processing system comprises a processor and a memory storing software instructions for execution on said processor, wherein the processor is at least partially provided as part of the radio receiver or the radio transmitter or a smart card or a remote server, or is included with the radio receiver in a receiver device, or is included with the radio transmitter in a transmitter device.

13. The radio system of claim 1, wherein:
the radio receiver is configured to detect radio signals on a plurality of frequency channels from a plurality of radio transmitters;
the radio receiver is configured to measure a respective signal strength of each of the radio signals; and
the processing system is configured to evaluate, for each radio transmitter, a measure of statistical dispersion of the respective signal strengths over the respective plurality of frequency channels, and to use the measures of statistical dispersion to identify a closest radio transmitter of the plurality of radio transmitters to the radio receiver.

14. The radio system of claim 1, further comprising a plurality of radio receivers, wherein:
each of the radio receivers is configured to detect the radio signals from the radio transmitter;
each of the radio receivers is configured to measure respective signal strengths of the radio signals for each of the plurality of frequency channels; and
the processing system is configured to evaluate, for each radio receiver, a measure of statistical dispersion of the respective signal strengths over the plurality of frequency channels, and to use the measures of statistical dispersion to identify a closest radio receiver of the plurality of radio receiver to the radio transmitter.

15. A method of controlling a radio system, the method comprising:
a radio receiver detecting radio signals transmitted from a radio transmitter on a plurality of frequency channels;
measuring respective signal strengths of the radio signals for each of the plurality of frequency channels; and
evaluating a measure of statistical dispersion of the respective signal strengths over the plurality of frequency channels, and using the measure of statistical dispersion to generate information relating to a proximity of the radio transmitter to the radio receiver, said information comprising a separation metric that increases with increasing geometrical distance between the radio transmitter and the radio receiver, such that the separation metric decreases monotonically with decreasing statistical dispersion for at least some average signal strengths.

16. The method of claim 15, further comprising:

the radio receiver detecting radio signals from a plurality of radio transmitters;

measuring a respective signal strength of each of the radio signals; and evaluating, for each radio transmitter, a respective measure of statistical dispersion of the signal strengths over the respective plurality of frequency channels, and using the measures of statistical dispersion to identify a closest radio transmitter of the plurality of radio transmitters to the radio receiver.

* * * * *